United States Patent
Bigaj et al.

(10) Patent No.: US 10,885,332 B2
(45) Date of Patent: Jan. 5, 2021

(54) DATA LABELING FOR DEEP-LEARNING MODELS

(71) Applicant: International Business Machines Corporation, Armonk, NY (US)

(72) Inventors: Rafal Bigaj, Cracow (PL); Lukasz G. Cmielowski, Cracow (PL); Marek Oszajec, Debica (PL); Maksymilian Erazmus, Zasow (PL)

(73) Assignee: International Business Machines Corporation, Armonk, NY (US)

( * ) Notice: Subject to any disclaimer, the term of this patent is extended or adjusted under 35 U.S.C. 154(b) by 111 days.

(21) Appl. No.: 16/354,352

(22) Filed: Mar. 15, 2019

(65) Prior Publication Data

US 2020/0293774 A1     Sep. 17, 2020

(51) Int. Cl.
   *G06K 9/62*     (2006.01)
   *G06K 9/00*     (2006.01)
   *G06N 3/08*     (2006.01)

(52) U.S. Cl.
   CPC ....... *G06K 9/00664* (2013.01); *G06K 9/6253* (2013.01); *G06K 9/6256* (2013.01); *G06N 3/08* (2013.01)

(58) Field of Classification Search
   CPC ....... G06T 7/0069; G06T 7/751; G06T 7/579; G06T 7/50; G06T 5/005; G06T 5/50;
   (Continued)

(56) References Cited

U.S. PATENT DOCUMENTS 9,858,533 B2    1/2018   Aliferis et al.
2016/0210534 A1  7/2016   Padubrin
(Continued)

FOREIGN PATENT DOCUMENTS

CN    106537420 A    3/2017

OTHER PUBLICATIONS

Mell et al., "The NIST Definition of Cloud Computing", Recommendations of the National Institute of Standards and Technology, Sep. 2011, 7 pages.
(Continued)

*Primary Examiner* — Duy M Dang
(74) *Attorney, Agent, or Firm* — Daniel C. Housley

(57) ABSTRACT

A first and second scoring endpoint with payload logging are deployed. At the second scoring endpoint, native data and a user-generated score for the native data are received, the native data is pre-processed into readable data for the deep-learning model, and the user-generated score and the readable data are output to the first scoring endpoint, which is associated directly with the deep-learning model. A raw payload that includes the native data is output to a payload store. At the first scoring endpoint, the readable data and the user-generated score are processed by the deep-learning model, which outputs a transformed payload and a prediction, respectively, to the payload store. The raw payload is matched with the transformed payload and the prediction to produce a comprehensive data set, which is evaluated to describe a set of transformation parameters. The deep-learning model is retrained to account for the set of transformation parameters.

13 Claims, 6 Drawing Sheets

(58) Field of Classification Search
CPC .. G06T 7/20; G06T 7/74; G06T 7/246; G06T 7/277; G06T 7/75; G06T 7/251; G06T 7/248; H04N 13/117; H04N 19/553; H04N 13/00; H04N 19/00; G06K 9/66; G06K 9/00335; G06K 9/00664; G06K 9/3233; G06K 9/4628; G06K 9/6274; G06K 9/6253; G06K 9/6256; G06N 3/08; G06N 20/00; G06N 5/14; G06N 5/048; G06N 3/045; H04L 29/06; H04L 63/1425
See application file for complete search history.

(56) References Cited

U.S. PATENT DOCUMENTS

| | | |
|---|---|---|
| 2017/0212829 A1 | 7/2017 | Bales et al. |
| 2017/0364794 A1* | 12/2017 | Mahkonen .............. H04L 43/10 |
| 2020/0036739 A1* | 1/2020 | Novikov ............. H04L 63/1425 |

OTHER PUBLICATIONS

Bigaj et al., "Data Labeling for Deep-Learning Models", U.S. Appl. No. 16/513,760, filed Jul. 17, 2019.
List of IBM Patents or Patent Applications Treated as Related, Jul. 12, 2019, 2 pages.

* cited by examiner

DATA LABELING FOR DEEP-LEARNING MODELS

BACKGROUND

The present disclosure relates generally to the field of deep-learning models, and more particularly to evaluating and providing feedback data for deep-learning models.

The evaluation and feedback data labeling for deep-learning models, where the pre-processing code is embedded in the model, can be difficult to execute and accurately assess. Traditional methods often fail to properly extract and/or define the logic used to transform training data into a more practical form. This may lead to a significant, perhaps burdensome, dedication of resources to determine the relationship between training data and transformative algorithms used in deep-learning models.

SUMMARY

Disclosed herein are embodiments of a method, system, and computer program product for evaluating and providing feedback data for deep-learning models.

A method, system, and computer program product may manage deep-learning models. A first and a second scoring endpoint with payload logging are deployed for a deep-learning model. At the second scoring endpoint, native data and a user-generated score for the native data are received. At the second scoring endpoint, the native data is pre-processed into readable data for the deep-learning model. From the second scoring endpoint, the user-generated score for the native data and the readable data are output to the first scoring endpoint; the first scoring endpoint is associated directly with the deep-learning model. From the second scoring endpoint, a raw payload that includes the native data is output to a payload store. At the first scoring endpoint the readable data and the user-generated score are processed using the deep-learning model, which outputs a transformed payload and a prediction, respectively, to the payload store. At the payload store, the raw payload is matched with the transformed payload and the prediction to produce a comprehensive data set. The comprehensive data set is evaluated to describe a set of transformation parameters, and the deep-learning model is retrained to account for the set of transformation parameters.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
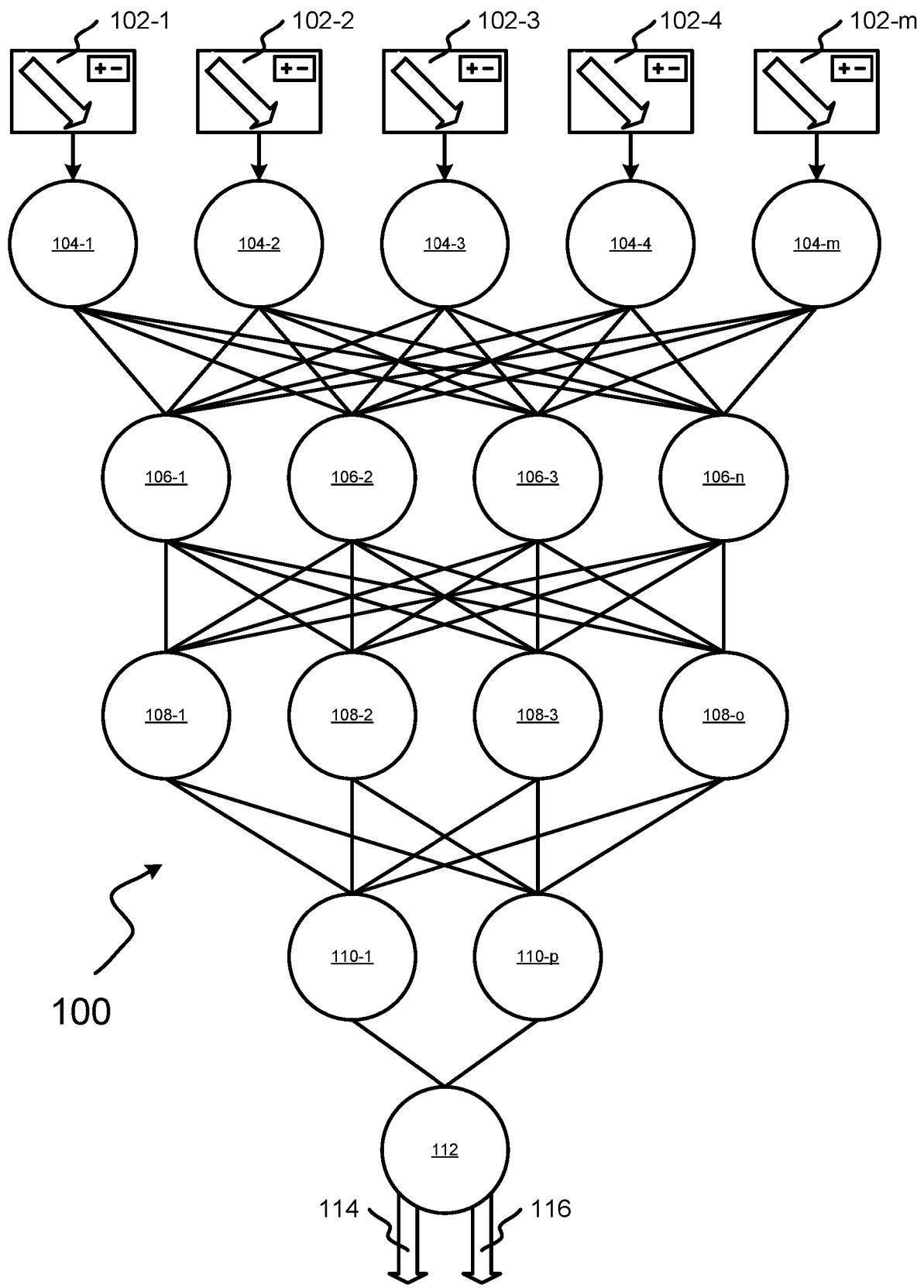
FIG. 1 illustrates an example of a neural network, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to deep-learning models, and more particularly to evaluating and providing feedback data for deep-learning models. While the present disclosure is not necessarily limited to such applications, various aspects of the disclosure may be appreciated through a discussion of various examples using this context.

An understanding of the embodiments of the present disclosure may be aided by describing examples in the context of a neural networking environment. Such as examples are intended to be illustrative, and not limiting in any sense.

When black box (e.g., deep-learning) models include pre-processing of raw data, it can be difficult to accurately and efficiently evaluate and label feedback data for retraining purposes. Conventionally, machine learning deployment systems (e.g., deep-learning models) have difficulty when defining/extracting the logic used to transform the training data into the format used by the model 1, because the pre-processing steps (e.g., image transformation, text vectorization, etc.) are usually not included in the machine learning model definition.

The present disclosure provides for the evaluation of deep-learning models in a production environment, and further provides for the collection of data that can be used for labeling and as feedback for retraining.

In embodiments, an additional scoring endpoint (e.g., a wrapping endpoint) may be deployed into the model's production environment to process the data in the original form, compatible with the form used in the training process. The wrapping endpoint may pre-process this raw data and send it to the original scoring endpoint (e.g., the native endpoint).

To collect and use feedback data for retraining purposes, payload logging must be enabled for both scoring endpoints. Matching the output payloads from both endpoints (e.g., a scored payload from the native endpoint and a prediction from the wrapping endpoint) will allow for the creation of a comprehensive data set that can be labeled and used for feedback. Having access to the data in a raw format (e.g., the original image, text, video, sound, or whatever native/raw file/data was originally used) and pre-processed data (e.g., the tensor representing vectorized text or rescaled image) as well as the prediction allows for a more accurate evaluation of the performance of the black box model, and more efficient and automatic retraining of said model, as the differences between the prediction and the actual result can be determined prior to any retraining. This determination can be used to more accurately adjust and retrain the model. In embodiments, a prediction may include an expected/anticipated outcome/transformation that occurs to the input data (e.g., raw/native data); in other words, an expectation of the ultimate output of the deep-learning model.

In embodiments, a system and/or environment for a deep-learning/black box model contemplated by the present disclosure may be created accordingly. A user (e.g., a system administrator, developer, etc.) may deploy the deep-learning model (e.g., a neural network or other black box model) into a production system (e.g., a computer system, a cloud environment with a virtualized computer system, etc.). As discussed above, payload logging should be enabled in the production environment.

In embodiments, the user may deploy a scoring endpoint that directly serves the native deep-learning model (e.g., a "direct endpoint"). Additionally, the user may deploy another scoring endpoint that "wraps" both the deep-learning model and direct endpoint (see FIG. 2). The "wrapping endpoint" may contain code (e.g., python, or any other suitable coding language) that describes the pre-processing steps for the native/raw data. The "wrapping endpoint" is also connected to the direct endpoint and is capable of invoking the direct endpoint (e.g., causing the direct endpoint to execute its tasks and the deep-learning model's tasks). As discussed herein, payload logging is enabled for both endpoints.

In embodiments, the user performs the scoring for the wrapping endpoint, providing the raw/native data and a unique scoring ID as a part of each submitted request (e.g., as an additional field, as metadata, etc.) The scoring ID may be passed to the direct endpoint, and the direct endpoint and deep-learning model may be invoked.

In embodiments, the payload output from the wrapping endpoint and the payload output from the direct endpoint may be matched and combined into a comprehensive data set. This may occur, for example, at a designated payload store. In embodiments, the comprehensive data set may further include the raw/native data and a prediction.

In embodiments, this comprehensive data set may be labeled for use as feedback data. In embodiments, the labeling may entail, for example, adding metadata annotations or otherwise identifying fields or other aspects of the output data/raw data/prediction/etc. as related to particular functions/nodes/weights/biases employed in the deep-learning model.

In embodiments, this labeled data may be used for more accurate evaluation of the deep-learning model (e.g., as opposed to native data, simple output, or a combination of the two), and/or may be used for automatic retraining purposes. The evaluation may include, for example, the parameters needed to transform the native data into the outcome and/or the prediction (e.g., "transformation parameters"). Using the labeled data for retraining does not require any extra labeled data pre-processing steps and can be included in the automatic retraining and redeployment process (e.g., automatic continuous learning). It may, for example, provide an accelerated method for refining the output of the model, as it includes additional data (e.g., a clearer determination of the transformation undergone by the native data, in relation to the predicted outcome) not found in the native data and/or output. In embodiments, an enhanced determination as to the difference between the prediction and the actual outcome may provide a tangible benefit over conventional methods, and allow a deep-learning model to be "tuned" or "refined" in a fraction of the time.

As discussed above, aspects of the disclosure may relate to the field of deep-learning models, and more particularly to evaluating and providing feedback data for deep-learning models. Accordingly, an understanding of the embodiments of the present disclosure may be aided by describing examples of a neural networking environment, and an example of a method for implementing embodiments of the present disclosure.

In embodiments, the production environment, and/or nodes of a neural network, may be distributed across a cloud computing environment. For example, a wrapping endpoint may be located locally to a user's device, while any layer, or individual node (e.g., a neuron), of a neural network may be located remotely, either in the storage/memory of a physical device (e.g., a traditional server in a server rack), or in the storage/memory of a virtualized device (e.g., a virtual system running on a hypervisor) whose associated physical components may, or may not, be located in a variety of locations. As such, a discussion of cloud computing environments may be beneficial.

Cloud computing is a model of service deliver for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities, but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrated is an example neural network 100, according to embodiments. In embodiments, inputs may include, for example, an image from which a particular object is to be identified, an audio file from which a song aspect of the audio (e.g., a key of a musical piece, an identification of a speaker, a natural language processing (NLP) transcription, etc.) is to be identified/determined, a video file from which an aspect of the video (e.g., an identification of objects/individuals within the video, an NLP transcription of the audio portion, an identification of a movie title from a smaller video sample, etc.) is to be identified, etc. In embodiments, neural network 100 may be a classifier-type neural network. Neural network 100 may be part of a larger neural network. For example, neural network 100 may be nested within a single, larger neural network, connected to several other neural networks, or connected to several other neural networks as part of an overall aggregate neural network.

Inputs 102-1 through 102-$m$ represent the inputs to neural network 100. In this embodiment, 102-1 through 102-$m$ do not represent different inputs. Rather, 102-1 through 102-$m$ represent the same input that is sent to each first-layer neuron (neurons 104-1 through 104-$m$) in neural network 100. In some embodiments, the number of inputs 102-1 through 102-$m$ (i.e., the number represented by m) may equal (and thus be determined by) the number of first-layer neurons in the network. In other embodiments, neural network 100 may incorporate 1 or more bias neurons in the first layer, in which case the number of inputs 102-1 through 102-$m$ may equal the number of first-layer neurons in the network minus the number of first-layer bias neurons. In some embodiments, a single input (e.g., input 102-1) may be input into the neural network. In such an embodiment, the first layer of the neural network may comprise a single neuron, which may propagate the input to the second layer of neurons.

Inputs 102-1 through 102-$m$ may comprise one or more artifact component(s) and a relative composition that is associated with a compositional artifact. For example, inputs 102-1 through 102-$m$ may comprise 10 components with their relative compositions that are associated with a seed artifact. In other embodiments, not all components and their relative compositions may be input into neural network 100. For example, in some embodiments, 30 components may be input into neural network 100, but relative compositions for only 20 components may be input into neural network 100.

Neural network 100 may comprise 5 layers of neurons (referred to as layers 104, 106, 108, 110, and 112, respectively corresponding to illustrated nodes 104-1 to 104-$m$, nodes 106-1 to 106-$n$, nodes 108-1 to 108-$o$, nodes 110-1 to 110-$p$, and node 112). In some embodiments, neural network 100 may have more than 5 layers or fewer than 5 layers. These 5 layers may each be comprised of the same number of neurons as any other layer, more neurons than any other layer, fewer neurons than any other layer, or more neurons than some layers and fewer neurons than other layers. In this embodiment, layer 112 is treated as the output layer. Layer 112 outputs a probability that a target event will occur, and contains only one neuron (neuron 112). In other embodiments, layer 112 may contain more than 1 neuron. In this illustration no bias neurons are shown in neural network 100. However, in some embodiments each layer in neural network 100 may contain one or more bias neurons.

Layers 104-112 may each comprise an activation function. The activation function utilized may be, for example, a rectified linear unit (ReLU) function, a SoftPlus function, a Soft step function, or others. Each layer may use the same activation function, but may also transform the input or output of the layer independently of or dependent upon the ReLU function. For example, layer 104 may be a "dropout" layer, which may process the input of the previous layer (here, the inputs) with some neurons removed from processing. This may help to average the data, and can prevent overspecialization of a neural network to one set of data or several sets of similar data. Dropout layers may also help to prepare the data for "dense" layers. Layer 106, for example, may be a dense layer. In this example, the dense layer may process and reduce the dimensions of the feature vector (e.g., the vector portion of inputs 102-1 through 102-$m$) to eliminate data that is not contributing to the prediction. As a further example, layer 108 may be a "batch normalization" layer. Batch normalization may be used to normalize the outputs of the batch-normalization layer to accelerate learning in the neural network. Layer 110 may be any of a dropout, hidden, or batch-normalization layer. Note that these layers are examples. In other embodiments, any of layers 104 through 110 may be any of dropout, hidden, or batch-normalization layers. This is also true in embodiments with more layers than are illustrated here, or fewer layers.

Layer 112 is the output layer. In this embodiment, neuron 112 produces outputs 114 and 116. Outputs 114 and 116 represent complementary probabilities that a target event will or will not occur. For example, output 114 may represent the probability that a target event will occur, and output 116 may represent the probability that a target event will not occur. In some embodiments, outputs 114 and 116 may each be between 0.0 and 1.0, and may add up to 1.0. In such embodiments, a probability of 1.0 may represent a projected absolute certainty (e.g., if output 114 were 1.0, the projected chance that the target event would occur would be 100%, whereas if output 116 were 1.0, the projected chance that the target event would not occur would be 100%).

FIG. 1 illustrates an example probability-generator neural network with one pattern-recognizer pathway (e.g., a pathway of neurons that processes one set of inputs and analyzes those inputs based on recognized patterns, and produces one set of outputs. However, some embodiments may incorporate a probability-generator neural network that may comprise multiple pattern-recognizer pathways and multiple sets of inputs. In some of these embodiments, the multiple pattern-recognizer pathways may be separate throughout the first several layers of neurons, but may merge with another pattern-recognizer pathway after several layers. In such embodiments, the multiple inputs may merge as well (e.g., several smaller vectors may merge to create one vector). This merger may increase the ability to identify correlations in the patterns identified among different inputs, as well as eliminate data that does not appear to be relevant.

In embodiments, neural network 100 may be trained (e.g., biases and weights among nodes may be calibrated) by inputting feedback and/or evaluation data as described herein, or otherwise inputting corrections into the neural network to arrive at an expected output. In embodiments, the impact of the feedback on the weights and biases may lessen over time, in order to correct for time-related changes (e.g., if a particular individual or object is identified from an image/video/audio sample, the individual/object may change over time (e.g., age/wear), causing future identifications to become less accurate, if the aging is unaccounted for). In embodiments, the degradation of the impact may be implemented using a half-life (e.g., the impact degrades by 50% for every time interval of X that has passed) or similar model (e.g., a quarter-life, three-quarter-life, etc.).

Figure 2:
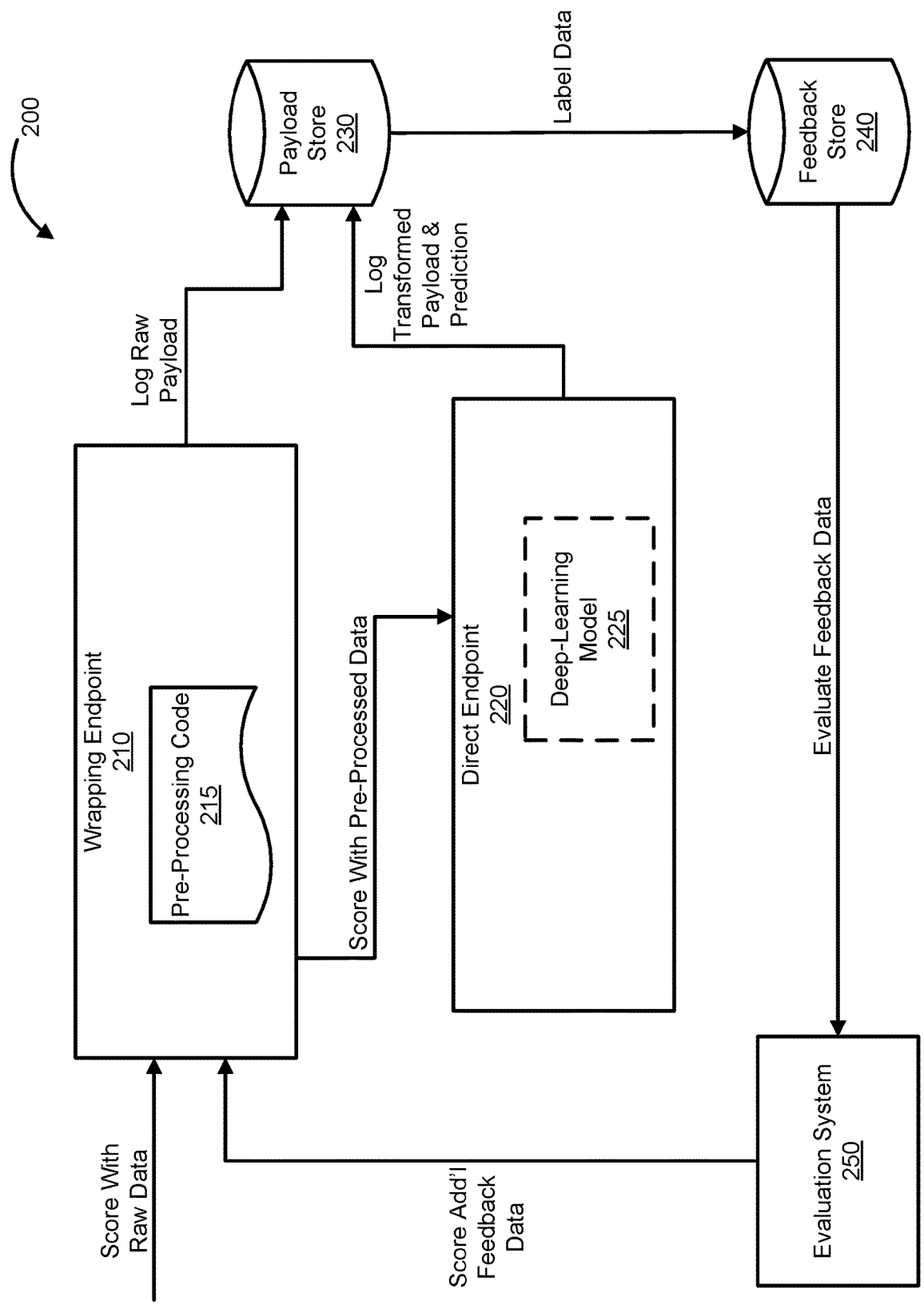
FIG. 2 illustrates a workflow diagram for evaluating and providing feedback data for deep-learning models, according to embodiments.

Referring now to FIG. 2, illustrated is a workflow diagram of a production environment 200 for evaluating and providing feedback data for deep-learning models, according to embodiments. Production environment 200 may include, for example, a wrapping endpoint 210 associated with pre-processing code 215, a direct endpoint 220 associated with deep-learning model 225, a payload store 230, a feedback store 240, and an evaluation system 250.

Wrapping endpoint 210 may include pre-processing code 215, as described herein. In embodiments, pre-processing code 215 may be used to prepare raw/native data and/or a user-generated score by converting it into a format that the deep-learning model 225 can process. For example, if the native data is a .jpeg image, and the goal of the deep-learning model is to identify any text within the image (e.g., to "read" a road sign/marquee/etc. within the image) then the pre-processing code 215 may, in embodiments, convert the image into an array of values indicating pixel position and color. In other embodiments, the raw data may already be in a format suitable for the deep-learning model 225, and may therefore not require pre-processing.

A user (e.g., system administrator, developer, or the like) may score the raw data either before submitting it to the wrapping endpoint, or by using the wrapping endpoint to score the raw data. As part of the scoring, the user may provide a unique scoring ID, which may be associated with any subsequent payloads/predictions to later identify/match outputs.

Once the raw data has been pre-processed by pre-processing code 215, or has otherwise been determined to be acceptable as input to deep-learning model 225, the raw payload may be output to payload store 230, and the pre-processed data and score may be output to the direct endpoint 220 and deep-learning model 225.

In embodiments, the deep-learning model 225 may process the pre-processed data, and the direct endpoint 220 may provide a prediction of the output of deep-learning model 225. The transformed payload (e.g., the output of deep-learning model 225) and the prediction may be output to payload store 230.

In embodiments, the raw payload, transformed payload, and the prediction may be matched at payload store 230. Matching may be accomplished by tracking the unique scoring ID provided by the user, as described herein. The combination of both payloads and the prediction may result in a comprehensive data set.

In embodiments, the comprehensive data set may be labeled for the purpose of serving as feedback data. Data labeling may include, for example, adding metadata annotations or otherwise identifying fields or other aspects of the output data/raw data/prediction/etc. as related to particular functions/nodes/weights/biases employed in the deep-learning model. Labeled data may be stored in feedback store 240.

In embodiments, feedback store 240 may be local to, or remote from, payload store 230, wrapping endpoint 210, or deep-learning model 225. For example, the entirety of production environment 200 may be implemented in a single computing device, in embodiments. However, it is contemplated that any given component, or even subcomponents of components described in production environment 200, may be remote from the other components, or have the relevant subcomponents distributed across a cloud computing environment. For example, in embodiments, wrapping endpoint 210, direct endpoint 220, and deep-learning model 225 may all be housed within a single computing system, local to a user. In this example, payload store 230 may be housed remotely within a physical server, and feedback store 240 and evaluation system 250 may both be "housed" across a plurality of devices within a cloud computing environment. In yet another embodiment, the entirety of production environment 200 may be "housed" within virtual machines running across a plurality of nodes/servers within a cloud computing environment, all remote to a given user.

In embodiments, this labeled data in feedback store 240 may be used for more accurate evaluation of the deep-learning model (e.g., as opposed to native data, simple output, or a combination of the two), and/or may be used for retraining purposes. Evaluation system 250 may use the labeled data to determine what parameters of deep-learning model 225 should be adjusted for a more accurate output (e.g., an output that more closely correlates to a preferred prediction). This may include, for example, an adjustment of algorithms used within the deep-learning model 225, an adjustment of weights or biases within the algorithms, etc.

Because the evaluation system 250 has access to the raw data, the pre-processing code, the user-generated score, the prediction, and the ultimate output, a more detailed understanding of the raw data's transformation to ultimate output can be obtained, compared to traditional methods. Retraining the deep-learning model by passing this evaluation/score back into the beginning of the production environment may, for example, provide an accelerated method for refining the output of the model, as it includes additional data (e.g., a clearer determination of the transformation undergone by the native data, in relation to the predicted outcome) not found in the native data and/or output. In embodiments, an enhanced/accelerated determination as to the difference between the predictions and the actual outcomes may provide a tangible benefit over conventional methods, and allow a deep-learning model to be "tuned" or "refined" in a fraction of the time, especially over several iterations of retraining.

Figure 3:
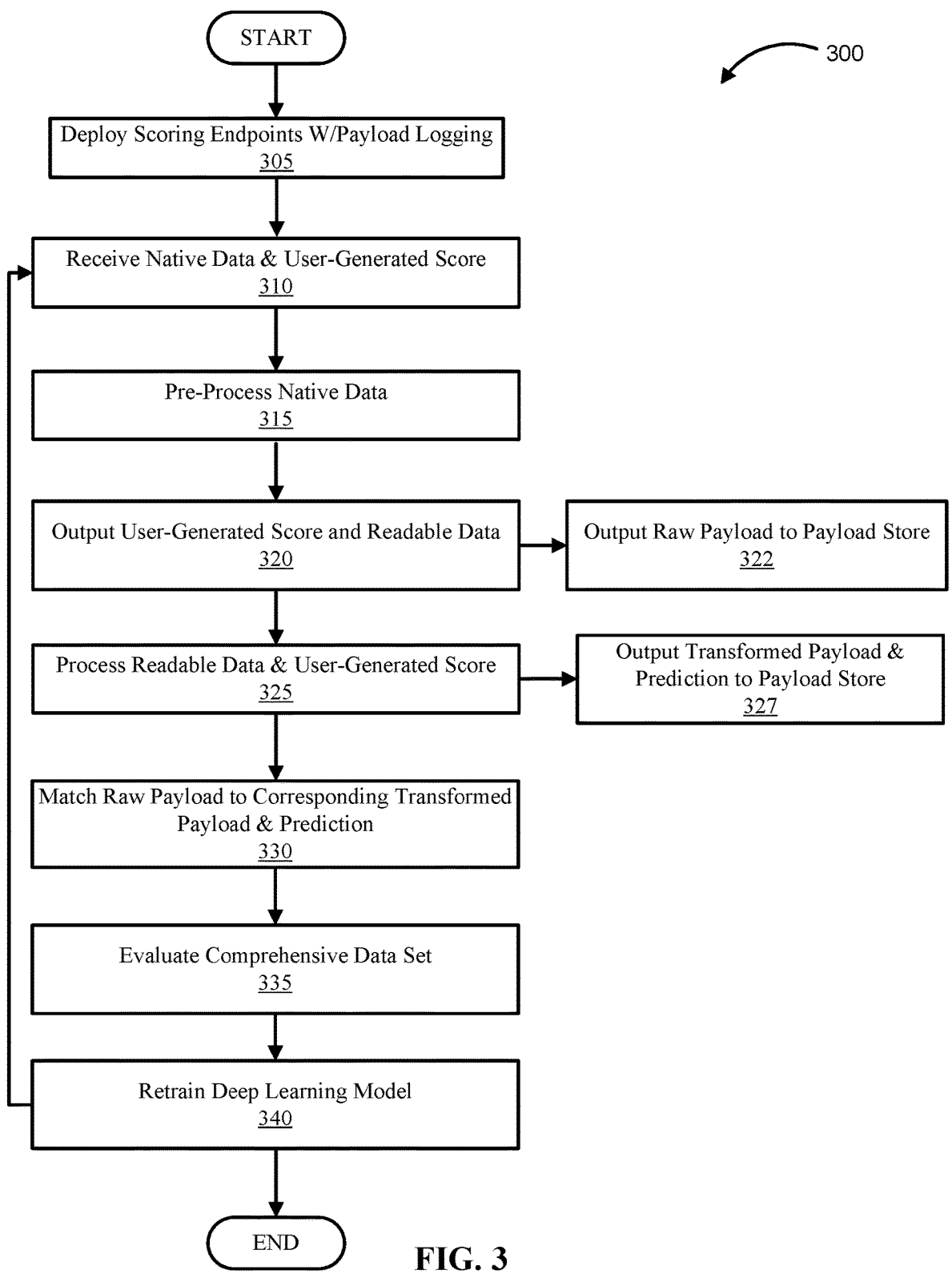
FIG. 3 depicts a flowchart of a method for evaluating and providing feedback for deep-learning models, according to embodiments.

Referring now to FIG. 3, illustrated is a flowchart of a method 300 for evaluating and providing feedback for deep-learning models, according to embodiments. In embodiments, scoring endpoints, with payload logging enabled, are deployed into the production environment of a deep-learning model, at 305.

At 310, native data and a user-generated score are received at a wrapping endpoint. For example, native data may include an image with a road sign, and the user-generated score may indicate what they user believes is depicted by the road sign (e.g., the word "stop," the symbol for an animal crossing, a street name, etc.).

At 315, the native data is pre-processed. As described herein, pre-processing of the native data may entail converting the data into a format that is usable/"readable" by a particular deep-learning model.

At 320, the user-generated score and the readable data (e.g., the pre-processed data) are output to a direct endpoint. Additionally, at 322, the raw payload is output to the payload store, as described herein.

At 325, the readable data is processed by the deep-learning model, and the user-generated score may be used to develop a prediction (e.g., a predicted outcome for the output of the deep-learning model). Additionally, at 327, the transformed payload (e.g., the output of the deep-learning model) and the prediction may be output to the payload store.

At 330, the raw payload may be matched to the corresponding transformed payload and prediction. This may be accomplished, for example, using unique scoring IDs, as contemplated herein. A complete set of matched data is referred to as a "comprehensive data set," as described herein.

At 335, the comprehensive data set is evaluated. Evaluation of the comprehensive data set may include, for example, data labeling of the comprehensive data set, as described herein. Evaluation may further include, for example, a determination of the relationships among the raw data, the user-generated score, the prediction, the transformed payload, etc. The relationships may be expressed, for example, as algorithms describing the functions/actions of the black box/deep-learning model's neurons, as compared to the prediction and user-generated score.

In embodiments, comprehensive data that has undergone data labeling may be stored in a feedback data store (e.g., a feedback data store substantially similar to feedback data store 240 of FIG. 2). Feedback data may be logged and stored for further analysis to further refine the deep-learning model in additional iterations, or for debugging purposes of the production environment, in general. In embodiments, the feedback data store and the payload store may be local to each other (e.g., housed in the same device and/or virtual machine).

At 340, the deep-learning model may be retrained. In embodiments, retraining of the deep-learning model may include incorporation of the evaluation obtained at 335. This may include reintroducing the evaluated data to the wrapping endpoint of the production environment as if it were native data and/or the user-generated score.

In embodiments, reintroduction of the evaluation may accelerated the refining/tuning process for the deep-learning model, thereby reducing the number of iterations needed to fully train the deep-learning model exponentially.

Figure 4:
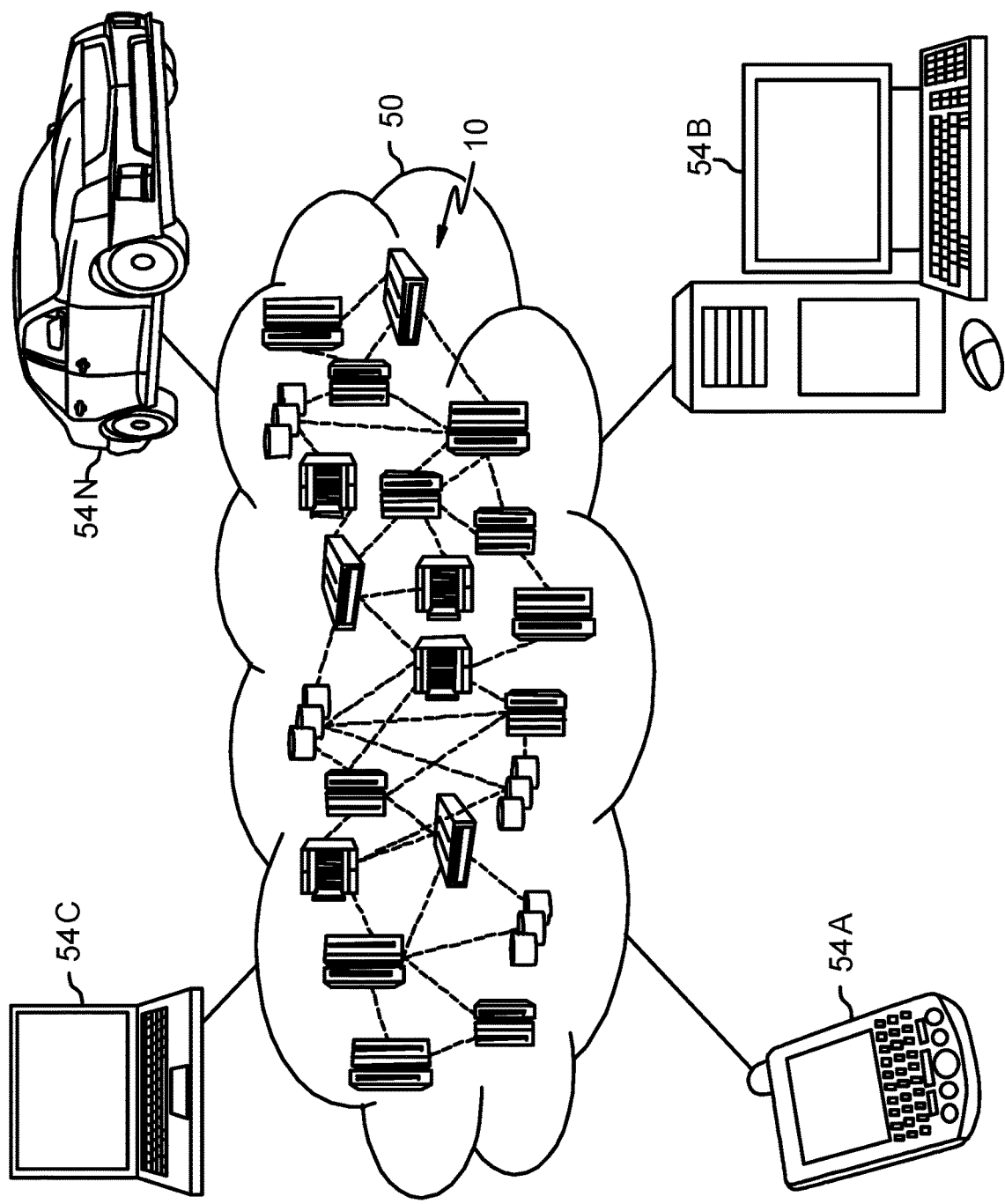
FIG. 4 depicts a cloud computing environment, according to embodiments.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 5:
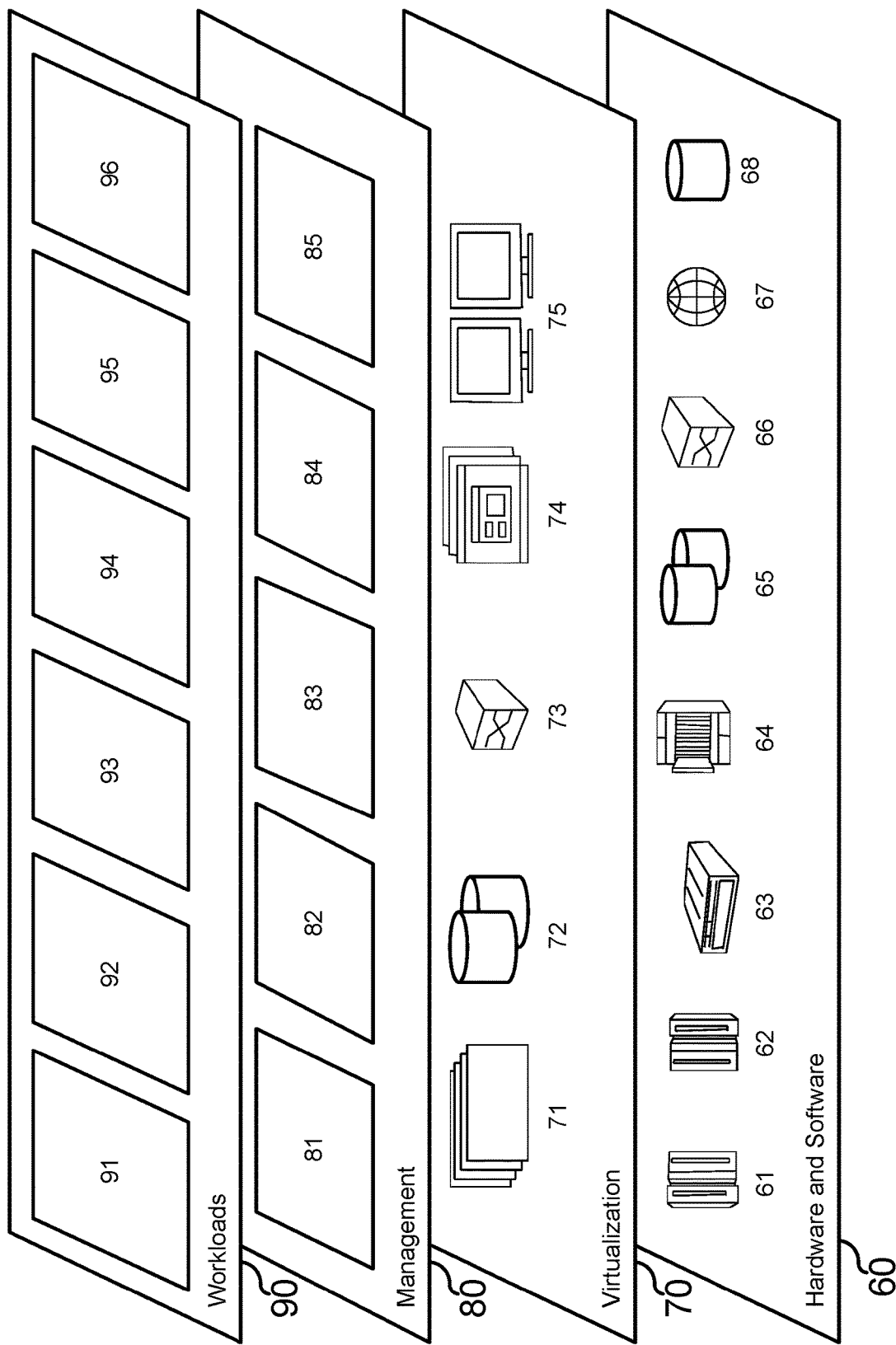
FIG. 5 depicts abstraction model layers, according to embodiments.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and evaluating and providing feedback data for deep-learning models 96.

Figure 6:
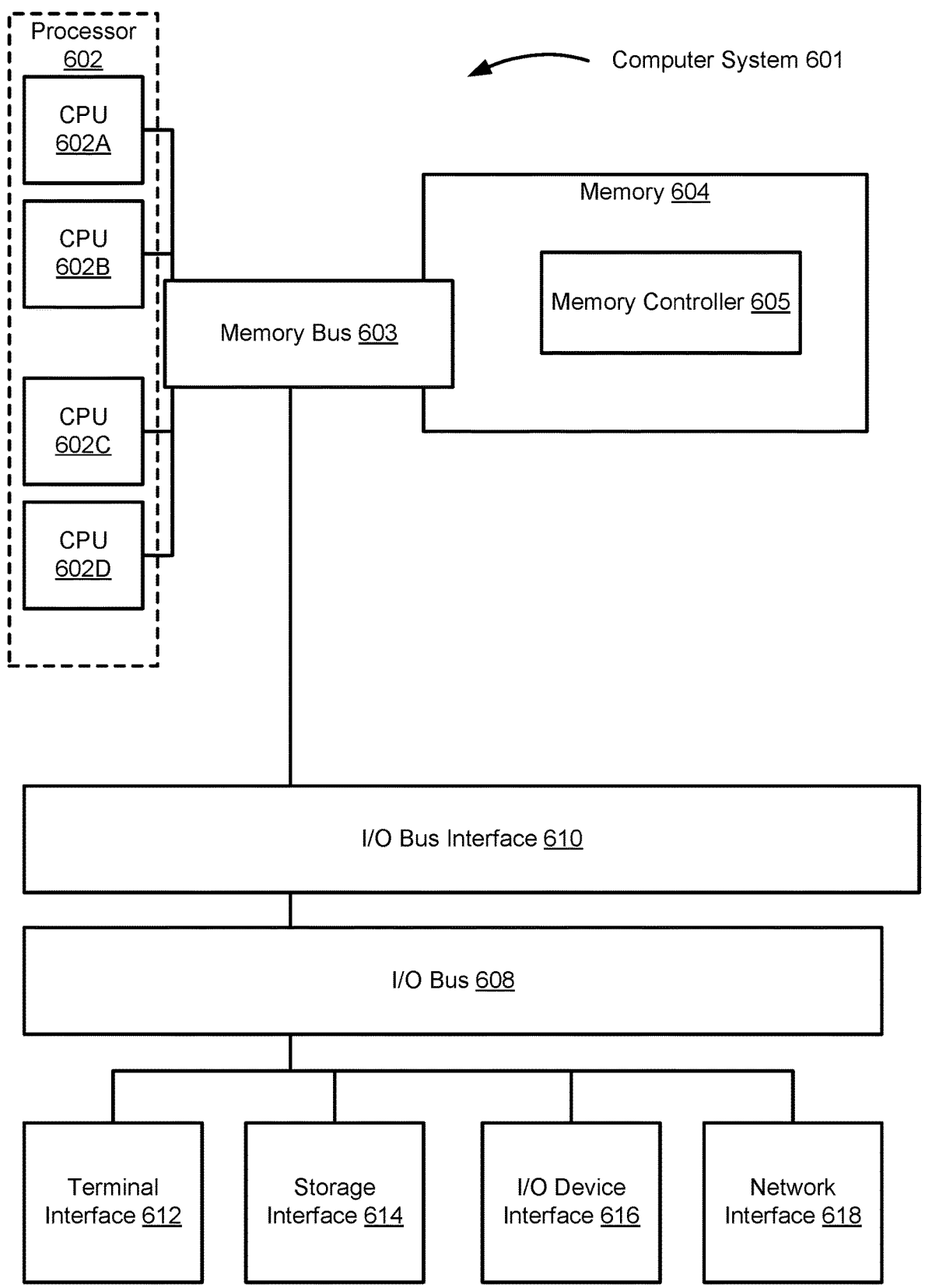
FIG. 6 depicts a high-level block diagram of an example computer system that may be used in implementing embodiments of the present disclosure.

Referring now to FIG. 6, shown is a high-level block diagram of an example computer system (e.g., computer) 601 that may be configured to perform various aspects of the present disclosure, including, for example, method 300, described in FIG. 3. The example computer system 601 may be used in implementing one or more of the methods or modules, and any related functions or operations, described herein (e.g., using one or more processor circuits or computer processors of the computer), in accordance with embodiments of the present disclosure. In some embodiments, the major components of the computer system 601 may comprise one or more CPUs 602, a memory subsystem 604, a terminal interface 612, a storage interface 614, an I/O (Input/Output) device interface 616, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable central processing units (CPUs) 602A, 602B, 602C, and 602D, herein generically referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may comprise one or more levels of on-board cache.

In some embodiments, the memory subsystem 604 may comprise a random-access semiconductor memory, storage device, or storage medium (either volatile or non-volatile) for storing data and programs. In some embodiments, the memory subsystem 604 may represent the entire virtual memory of the computer system 601, and may also include the virtual memory of other computer systems coupled to the computer system 601 or connected via a network. The memory subsystem 604 may be conceptually a single monolithic entity, but, in some embodiments, the memory subsystem 604 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 604 may contain elements for control and flow of memory used by the CPU 602. This may include a memory controller 605.

Although the memory bus 603 is shown in FIG. 6 as a single bus structure providing a direct communication path among the CPUs 602, the memory subsystem 604, and the I/O bus interface 610, the memory bus 603 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smart phone, mobile device, or any other appropriate type of electronic device.

It is noted that FIG. 6 is intended to depict the representative major components of an example computer system 601. In some embodiments, however, individual components may have greater or lesser complexity than as represented in FIG. 6, components other than or in addition to those shown in FIG. 6 may be present, and the number, type, and configuration of such components may vary.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system for managing deep-learning, comprising:
   a memory with program instructions stored thereon; and
   a processor in communication with the memory, wherein the program instructions cause the system to:
      deploy a first and a second scoring endpoint with payload logging for a deep-learning model;
      receive, at the second scoring endpoint, native data and a user-generated score for the native data;
      pre-process, at the second scoring endpoint, the native data into readable data for the deep-learning model;
      output, from the second scoring endpoint to the first scoring endpoint, the user-generated score for the native data and the readable data, wherein the first scoring endpoint is associated directly with the deep-learning model;
      output, from the second scoring endpoint to a payload store, a raw payload, wherein the raw payload includes the native data;
      process, at the first scoring endpoint and using the deep-learning model, the readable data and the user-generated score to output a transformed payload and a prediction, respectively, to the payload store;
      match, at the payload store, the raw payload with the transformed payload and the prediction to produce a comprehensive data set;
      evaluate the comprehensive data set to describe a set of transformation parameters; and
      retrain the deep-learning model to account for the set of transformation parameters.

2. The system of claim 1, wherein the program instructions further cause the system to:
   evaluate, based on comparing the prediction and the transformed payload, the performance of the deep-learning model; and use the performance evaluation of the deep-learning model to retrain the deep-learning model.

3. The system of claim 1, wherein evaluating the comprehensive data set includes data labeling, according to the functions of the neurons of the deep-learning model.

4. The system of claim 3, wherein the retraining includes multiple iterations of the deep-learning model.

5. The system of claim 4, wherein the matching is performed using a unique scoring ID, wherein the unique scoring ID is assigned to the user-generated score and the raw data, and wherein the unique scoring ID is subsequently associated with the raw payload, transformed payload, and the user-generated score.

6. The system of claim 5, wherein the native data includes a video file and the transformed payload includes an identification of an object depicted within the video.

7. The system of claim 6, wherein software is provided as a service in a cloud environment to execute the program instructions.

8. A computer program product for managing deep-learning, the computer program product comprising a computer readable storage medium having program instructions embodied therewith, the program instructions executable by a device to cause the device to:

deploy a first and a second scoring endpoint with payload logging for a deep-learning model;

receive, at the second scoring endpoint, native data and a user-generated score for the native data;

pre-process, at the second scoring endpoint, the native data into readable data for the deep-learning model;

output, from the second scoring endpoint to the first scoring endpoint, the user-generated score for the native data and the readable data, wherein the first scoring endpoint is associated directly with the deep-learning model;

output, from the second scoring endpoint to a payload store, a raw payload, wherein the raw payload includes the native data;

process, at the first scoring endpoint and using the deep-learning model, the readable data and the user-generated score to output a transformed payload and a prediction, respectively, to the payload store;

match, at the payload store, the raw payload with the transformed payload and the prediction to produce a comprehensive data set;

evaluate the comprehensive data set to describe a set of transformation parameters; and retrain the deep-learning model to account for the set of transformation parameters.

9. The computer program product of claim 8, wherein the program instructions further cause the device to:

evaluate, based on comparing the prediction and the transformed payload, the performance of the deep-learning model; and use the performance evaluation of the deep-learning model to retrain the deep-learning model.

10. The computer program product of claim 8, wherein evaluating the comprehensive data set includes data labeling, according to the functions of the neurons of the deep-learning model.

11. The computer program product of claim 10, wherein the retraining includes multiple iterations of the deep-learning model.

12. The computer program product of claim 11, wherein the matching is performed using a unique scoring ID, wherein the unique scoring ID is assigned to the user-generated score and the raw data, and wherein the unique scoring ID is subsequently associated with the raw payload, transformed payload, and the user-generated score.

13. The computer program product of claim 12, wherein the native data includes a video file and the transformed payload includes an identification of an object depicted within the video.

* * * * *